United States Patent
Kato et al.

(10) Patent No.: US 10,192,664 B2
(45) Date of Patent: Jan. 29, 2019

(54) EXCITING DEVICE FOR ELECTROMAGNETIC CONNECTION DEVICE

(71) Applicant: OGURA CLUTCH CO., LTD., Gunma (JP)

(72) Inventors: Motoi Kato, Gunma (JP); Yoshihiro Kurosu, Gunma (JP); Yasuyuki Iizuka, Gunma (JP); Yoshikazu Arai, Gunma (JP)

(73) Assignee: OGURA CLUTCH CO., LTD., Gunma (JP)

( * ) Notice: Subject to any disclaimer, the term of this patent is extended or adjusted under 35 U.S.C. 154(b) by 3 days.

(21) Appl. No.: 15/672,183

(22) Filed: Aug. 8, 2017

(65) Prior Publication Data

US 2018/0047489 A1 Feb. 15, 2018

(30) Foreign Application Priority Data

Aug. 9, 2016 (JP) ................. 2016-156191

(51) Int. Cl.
*H01F 5/04* (2006.01)
*H01F 5/02* (2006.01)
(Continued)

(52) U.S. Cl.
CPC ............... *H01F 5/04* (2013.01); *F16D 67/06* (2013.01); *H01F 5/02* (2013.01); *H01F 3/00* (2013.01); *H01F 38/00* (2013.01)

(58) Field of Classification Search
CPC ..... H01F 5/02; H01F 5/04; H01F 3/00; H01F 38/00; F16D 67/06
See application file for complete search history.

(56) References Cited

U.S. PATENT DOCUMENTS 5,001,379 A * 3/1991 Katayama ................. H01F 5/04
 310/194
5,119,918 A 6/1992 Pardee
(Continued)

FOREIGN PATENT DOCUMENTS

DE 19911926 A1 10/1999
EP 0422962 A1 4/1991
(Continued)

OTHER PUBLICATIONS

European Search Report and Written Opinion received for EP Patent Application No. 17184503.5, dated Feb. 7, 2018, 4 pages.

*Primary Examiner* — Mohamad Musleh
(74) *Attorney, Agent, or Firm* — Womble Bond Dickinson (US) LLP

(57) ABSTRACT

A yoke includes an annular groove in which an exciting coil is stored, and a first through hole formed in the bottom of the annular groove. A terminal housing includes a boss portion fitted in the first through hole and a connecting concave portion located on the opposite side of the annular groove with respect to the boss portion. The boss portion includes a second through hole extending in a direction parallel to the center line of the first through hole. An external connecting terminal is buried in the terminal housing. The external includes a coil extraction hole continuing to the second through hole. The extraction end of the exciting coil is soldered to the terminal in a state in which the extraction end is passed through the second through hole and the coil extraction hole.

4 Claims, 13 Drawing Sheets

(51) Int. Cl.
  *F16D 67/06* (2006.01)
  *H01F 3/00* (2006.01)
  *H01F 38/00* (2006.01)

(56) References Cited

U.S. PATENT DOCUMENTS

| | | | | |
|---|---|---|---|---|
| 5,157,367 | A * | 10/1992 | Itoh | H01F 5/04 335/126 |
| 5,307,038 | A * | 4/1994 | Ishimaru | F16D 27/112 192/84.961 |
| 5,663,699 | A * | 9/1997 | Shiroyama | H01H 51/065 335/126 |
| 6,031,444 | A * | 2/2000 | Agata | H01F 5/04 336/192 |
| 2017/0287612 | A1* | 10/2017 | Kurosu | F16D 27/00 |

FOREIGN PATENT DOCUMENTS

| | | |
|---|---|---|
| JP | S63-006512 Y | 2/1988 |
| JP | 02059327 | 4/1990 |
| JP | H02-059327 U1 | 4/1990 |
| JP | 10-176726 A | 6/1998 |
| JP | 2013-234723 A | 11/2013 |

* cited by examiner

EXCITING DEVICE FOR ELECTROMAGNETIC CONNECTION DEVICE

BACKGROUND OF THE INVENTION

The present invention relates to an exciting device for an electromagnetic connection device in which the extraction end of an exciting coil and an external connecting terminal are connected outside a yoke.

Conventionally, an electromagnetic connection device such as an electromagnetic clutch or an electromagnetic brake includes a yoke to guide the magnetic flux of an exciting coil to an armature side. The yoke is formed into a ring shape so as to pass a rotating shaft to the axis. The yoke has an annular groove open to the armature side. The exciting coil is stored in the annular groove. The exciting coil includes two extraction ends that are a winding start end and a winding termination end. These extraction ends are derived out of the yoke through the bottom wall of the yoke, which serves as the bottom of the annular groove, and connected to a power supply connector fixed to the yoke.

Exciting devices of this type for an electromagnetic connection device are disclosed in Japanese Utility Model Publication No. 63-6512 (literature 1) and Japanese Utility Model Laid-Open No. 2-59327 (literature 2).

The exciting device disclosed in literature 1 includes a power supply connector with a structure in which a pair of terminals are buried in a terminal housing. This connector is attached to a fixing member provided on the bottom wall of a yoke. The pair of connectors each include a plate-shaped locking portion bent to extend to the opposite side of the yoke. In this exciting device, two extraction ends of an exciting coil are derived out of the yoke through a rubber bushing provided on the bottom wall of the yoke, clamped by the above-described plate-shaped locking portions, and in this state, connected to the plate-shaped locking portions by a fixing means such as soldering or fusing (heat caulking). The connected portions are covered by a lid and cut off from the outside. Fixing of the connector is done by passing a plurality of fixing pawls formed by cut-and-raising through the above-described lid and expanding the distal ends of the fixing pawls to press the lid against the terminal housing.

The power supply connector disclosed in patent literature 2 is formed by a terminal housing and a pair of terminals. The terminal housing includes a convex portion fitted in a first through hole formed in the bottom wall of a yoke. Two second through holes are formed in the convex portion to pass the two extraction ends of an exciting coil. The pair of connectors each include a locking portion extending to the opposite side of the yoke. The locking portions are provided at positions adjacent to the above-described convex portion. The extraction ends derived from the second through holes are bent and hooked on the locking portions, and soldered in this state. Fixing of the connector is done by pressing the terminal housing against a fixing plate provided on the yoke using the fixing pawls of the fixing plate.

As described above, in the exciting device disclosed in literature 1 or 2, the extraction ends of the exciting coil need to be clamped by or bent and hooked on the locking portions of the external connecting terminal and thus temporarily fixed. Hence, the electromagnetic connection device including the exciting device needs an assembly process for temporarily fixing the extraction ends, resulting in low productivity.

SUMMARY OF THE INVENTION

It is an object of the present invention to provide an exciting device for an electromagnetic connection device, which can easily connect the extraction end of an exciting coil and an external connecting terminal and thus improve productivity and reduce cost.

In order to achieve the above object, according to the present invention, there is provided an exciting device for an electromagnetic connection device, comprising a yoke including an annular groove and a first through hole formed in a bottom wall serving as a bottom of the annular groove, an exciting coil stored in the annular groove, a terminal housing including a convex portion fitted in the first through hole and a concave portion located on an opposite side of the annular groove with respect to the convex portion, the convex portion including a second through hole extending in a direction parallel to a center line of the first through hole, and an external connecting terminal buried in the terminal housing in a state in which a portion of the external connecting terminal is exposed in the concave portion, the external connecting terminal including a coil extraction hole formed in the portion exposed in the concave portion and continuing to the second through hole, and the exciting coil including an extraction end soldered to the external connecting terminal in a state in which the extraction end is passed through the second through hole and the coil extraction hole.

DESCRIPTION OF THE PREFERRED EMBODIMENT

An exciting device for an electromagnetic connection device according to an embodiment of the present invention will now be described in detail with reference to FIGS. 1 to 14.

Figure 1:
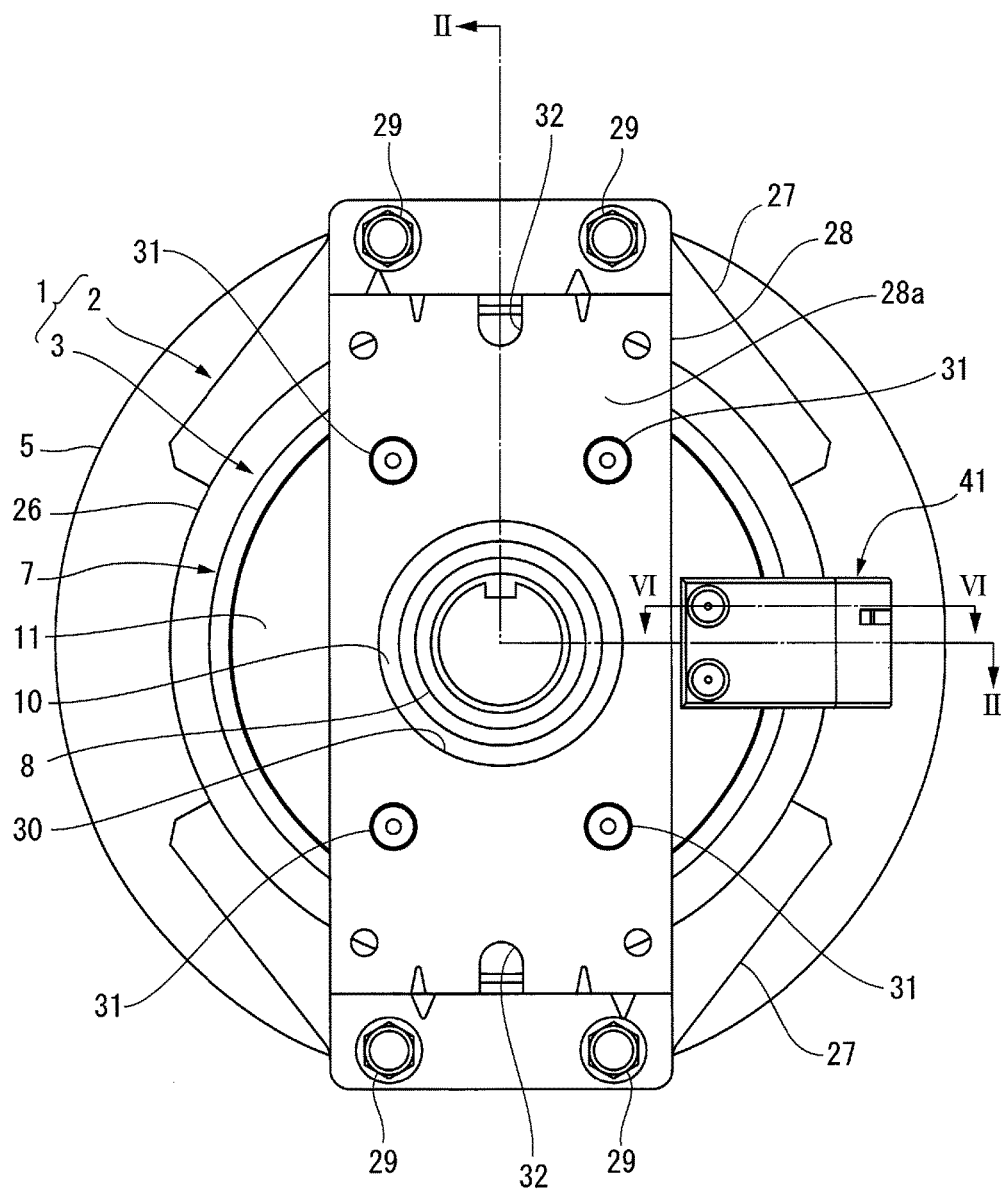
FIG. 1 is a rear view of an electromagnetic clutch including an exciting device according to an embodiment of the present invention.

An electromagnetic connection device 1 shown in FIG. 1 is formed by assembling an exciting device 3 according to an embodiment of the present invention to the clutch portion of an electromagnetic clutch disclosed in Japanese Patent Laid-Open No. 2013-234723 (literature 3). The electromagnetic clutch disclosed in literature 3 is used as a power transmission device for a lawn mower or a snow plow. However, the power transmission device equipped with the exciting device 3 is not limited to the electromagnetic clutch. That is, the exciting device 3 can be mounted not only on the electromagnetic clutch of a lawn mower or a snow plow but also on an electromagnetic clutch used as a power transmission device for the compressor of a car air conditioner and an electromagnetic clutch or electromagnetic brake used as a power transmission device or braking device for general industrial machinery.

The electromagnetic connection device 1 shown in FIG. 1 is formed by a clutch 2 with a brake mechanism identical to that disclosed in literature 3, and the exciting device 3 configured to switch the operation of the clutch 2.

<Arrangement of Clutch with Brake Mechanism>

Figure 2:
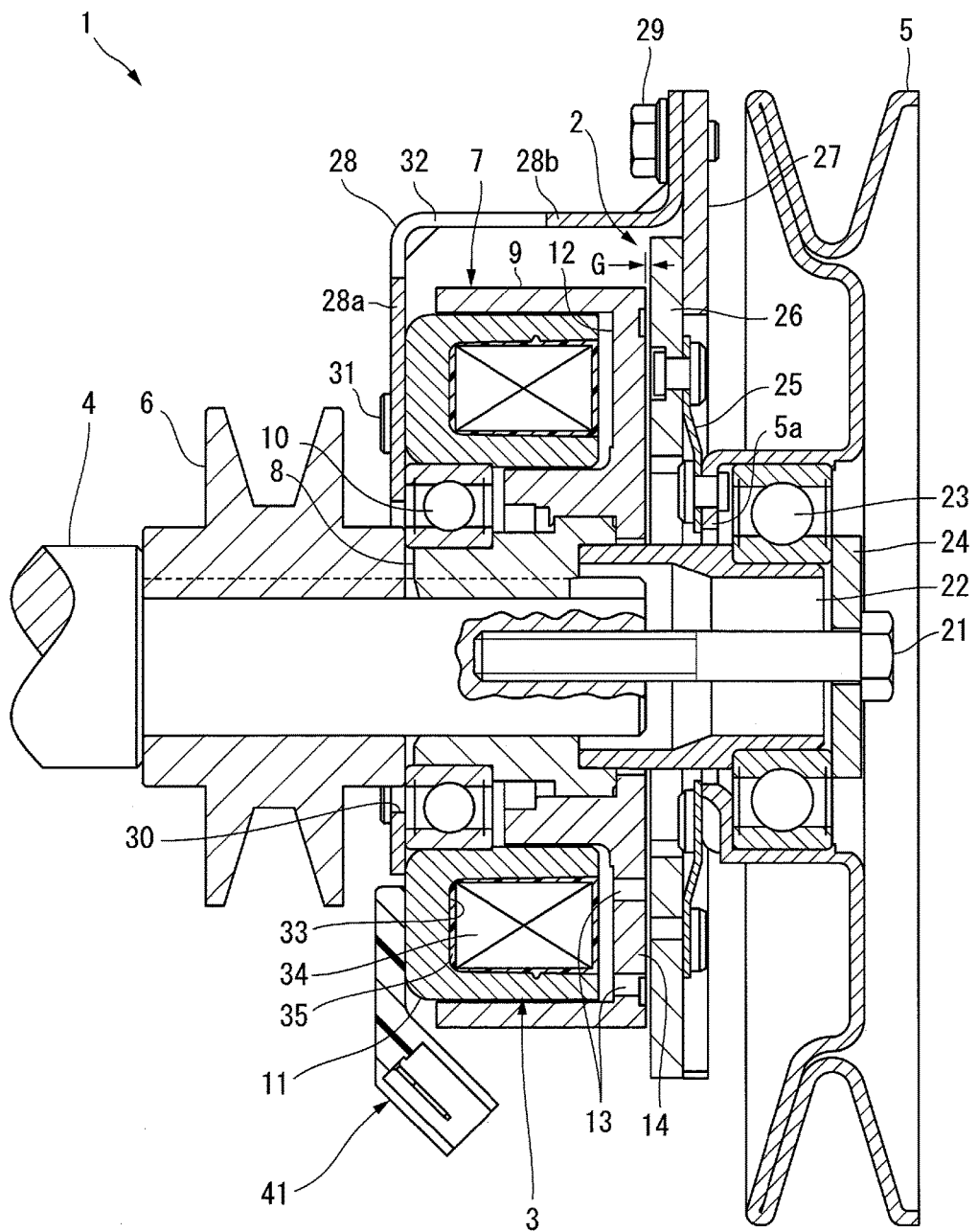
FIG. 2 is a sectional view taken along a line II-II in FIG. 1.

As shown in FIG. 2, the clutch 2 with the brake mechanism switches between a connected state in which the rotation of an input shaft 4 illustrated on the leftmost side in FIG. 2 is transmitted to a first output pulley 5 illustrated on the rightmost side in FIG. 2 and a disconnected state in which the rotation transmission is cut off. A description will be made below defining the distal end side (the right side in FIG. 2) of the input shaft 4 as the front side of the clutch 2, and the opposite side as the rear side of the clutch 2 for the descriptive convenience.

The input shaft 4 rotates by receiving power transmitted from a driving source such as an engine or a motor, although not shown. A second output pulley 6 and a tubular shaft portion 8 of a rotor 7 are attached to the input shaft 4 by key fitting such that they integrally rotate.

The rotor 7 includes the tubular shaft portion 8 that is an axis portion, and a flange portion 9 fixed to the outer peripheral portion of the tubular shaft portion 8. A yoke 11 of the exciting device 3 (to be described later) is rotatably connected to the outer peripheral portion of the tubular shaft portion 8 via a first bearing 10. An annular groove 12 having a U-shaped section and open to the rear side of the clutch 2 and a plurality of arc slits 13 are formed in the flange portion 9 of the rotor 7. The slits 13 extend through a disc portion 14 that forms the bottom of the annular groove 12, and extend in the circumferential direction of the flange portion 9. The slits 13 are formed at a plurality of points of the disc portion 14 in the circumferential direction. At each point, two slits 13 are arranged in the radial direction.

A fixing bolt 21 is screwed in the front end of the input shaft 4. The fixing bolt 21 presses a cylindrical bearing collar 22 to the tubular shaft portion 8 of the rotor 7 via a second bearing 23 and a press plate 24. The second bearing 23 is fitted on the outer peripheral portion of the bearing collar 22 and held. The above-described first output pulley 5 is rotatably supported by the bearing collar 22 via the second bearing 23.

An inner peripheral portion 5a of the first output pulley 5 extends to the rear side of the clutch 2 with respect to the second bearing 23. An armature 26 is connected to the inner peripheral portion 5a via a leaf spring 25. The armature 26 is formed into a ring-shaped plate and faces the front surface of the above-described rotor 7 at a predetermined air gap G. A braking plate 27 is arranged on the front side of the clutch with respect to the armature 26. In a natural state, the leaf spring 25 biases the armature 26 such that the armature 26 is pressed against the braking plate 27 from the rear side.

The braking plate 27 gives a frictional resistance to the armature 26 when the armature 26 is pressed by the spring force of the leaf spring 25. The braking plate 27 is fixed to the front end of a detent plate 28 by fixing bolts 29. The detent plate 28 is formed by bending a metal plate material into a predetermined shape. More specifically, as shown in FIG. 1, the detent plate 28 is formed by a rectangular flat plate portion 28a extending in the radial direction of the first output pulley 5 when viewed from the axial direction of the clutch 2, and arm portions 28b (see FIG. 2) extending frontward from both ends of the flat plate portion 28a and having the braking plate 27 attached to the front ends.

A circular hole 30 to pass the input shaft 4 and the second output pulley 6 is formed at the center of the flat plate portion 28a. In addition, the yoke 11 to be described later is fixed to the flat plate portion 28a by a plurality of rivets 31. Holes 32 are formed in corner portions that are the connection portions between the flat plate portion 28a and the arm portions 28b. Connecting members (not shown) configured to connect the detent plate 28 to a housing (not shown) that stores the electromagnetic connection device 1 are passed through the holes 32. Rotation of the detent plate 28 is stopped on the housing by the connecting members.

<Arrangement of Exciting Device>

Figure 3:
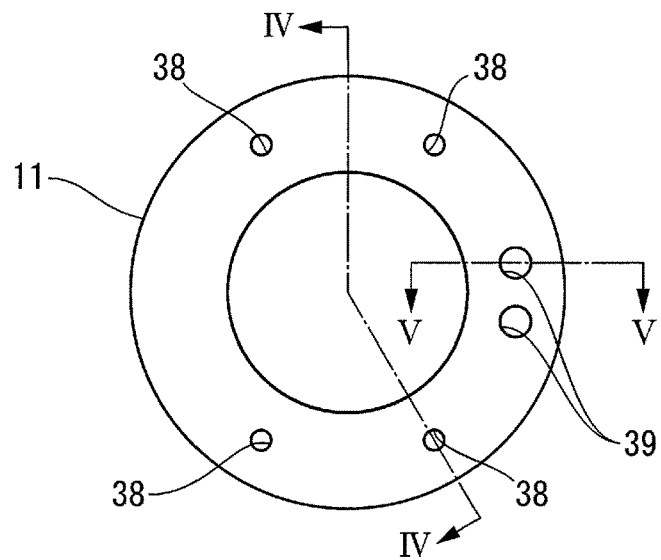
FIG. 3 is a rear view of a yoke.

The exciting device 3 is formed by assembling various kinds of parts to the yoke 11. As shown in FIG. 3, the yoke 11 is formed into a ring shape. As shown in FIG. 2, in a state in which the inner peripheral portion of the yoke 11 is rotatably supported by the tubular shaft portion 8 via the first bearing 10, the yoke 11 is stored in the annular groove 12 of the rotor 7. The yoke 11 is located coaxially with the input shaft 4.

Figure 4:
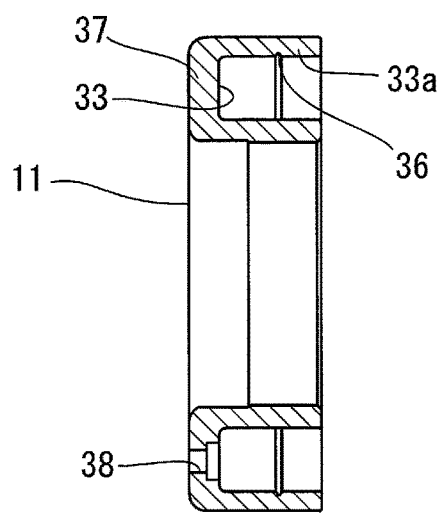
FIG. 4 is a sectional view taken along a line IV-IV in FIG. 3.
Figure 5:
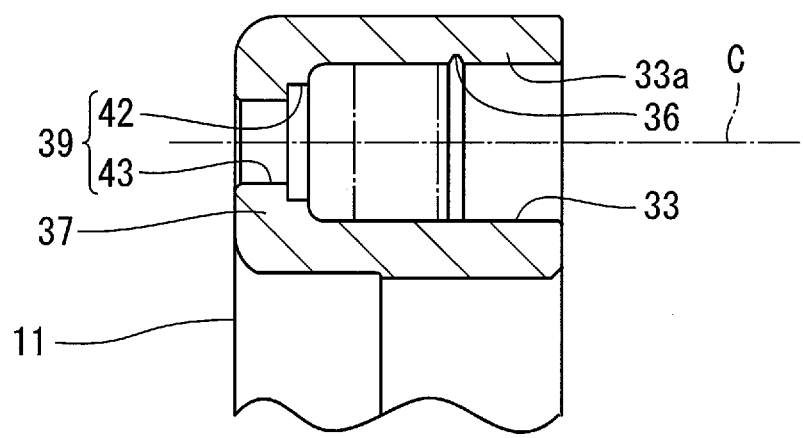
FIG. 5 is an enlarged sectional view showing the portion of a first through hole of the yoke taken along a line V-V in FIG. 3.

As shown in FIGS. 2 and 4, an annular groove 33 open to the front side of the clutch 2 is formed in the yoke 11. An exciting coil 34 is stored in the annular groove 33. In this state, the annular groove 33 is sealed by an insulating resin 35. As shown in FIGS. 4 and 5, a groove 36 extending in the circumferential direction of the yoke 11 is formed in a groove wall 33a on the outer side of the annular groove 33 according to this embodiment. The groove 36 is configured to prevent the exciting coil 34 from dropping. That is, the insulating resin 35 poured into the groove 36 and hardened is locked in the yoke 11, thereby regulating the movement of the annular exciting coil 34 in the axial direction.

As shown in FIG. 3, four small-diameter holes 38 and two first through holes 39 are formed in a bottom wall 37 serving as the bottom of the annular groove 33 in the yoke 11. The four small-diameter holes 38 are holes used to pass the rivets 31 to fix the yoke 11 to the above-described detent plate 28. As shown in FIG. 1, the two first through holes 39 are holes used to attach an external power supply connector 41 to the bottom wall 37. As shown in FIGS. 4 and 5, each of the first through holes 39 is formed by a large-diameter portion 42 open into the annular groove 33, and a small-diameter portion 43 open to the rear surface of the bottom wall 37. The large-diameter portion 42 has a hole diameter larger than that of the small-diameter portion 43.

<Arrangement of External Power Supply Connector>

Figure 6:
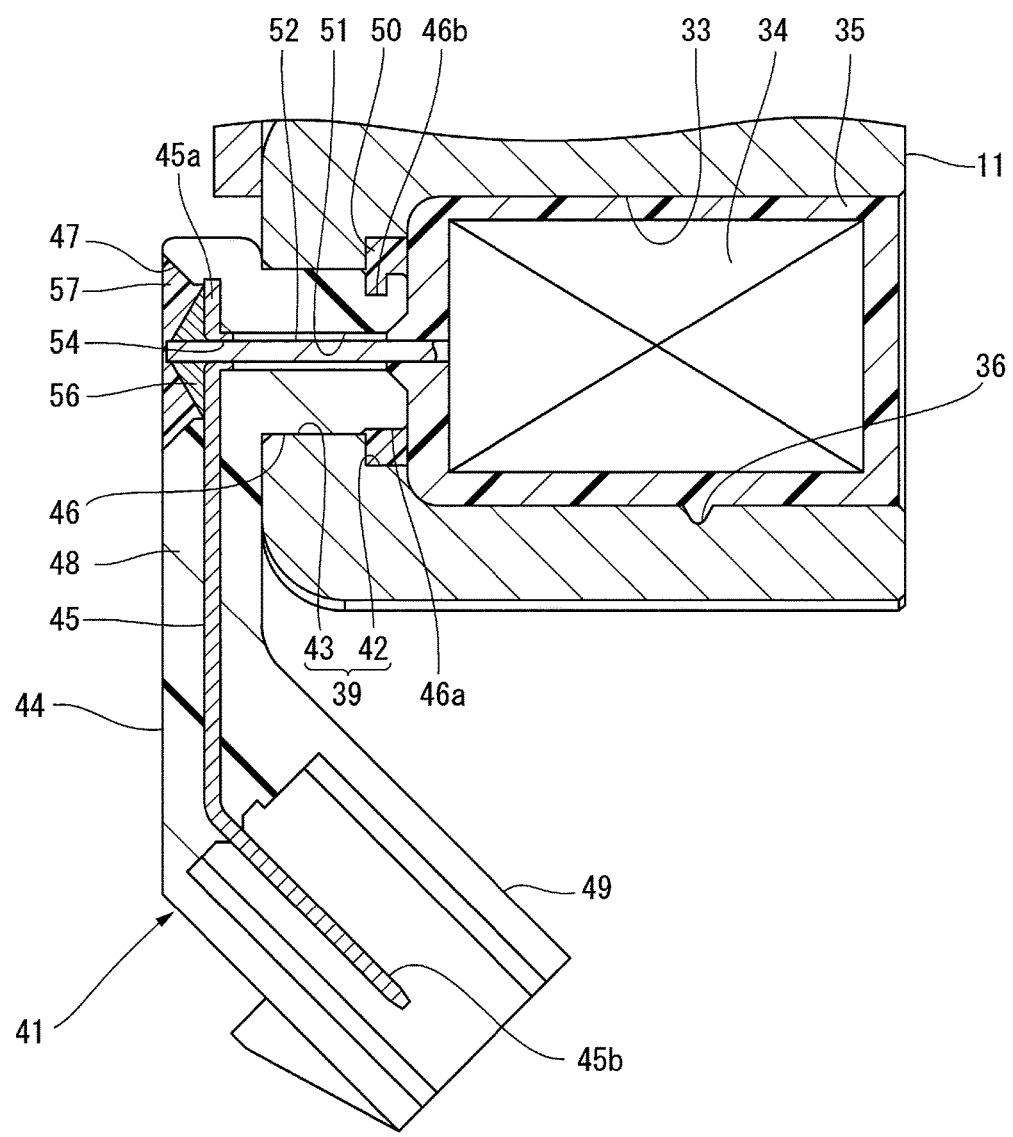
FIG. 6 is a sectional view taken along a line VI-VI in FIG. 1.

The external power supply connector 41 is used to connect a feeder cable (not shown) to the exciting coil 34. As shown in FIG. 6, the external power supply connector 41 according to this embodiment is formed by a terminal housing 44 made of a plastic material, and two external connecting terminals 45 buried in the terminal housing 44 by insert molding.

As shown in FIGS. 6 to 12, the terminal housing 44 includes two boss portions 46 fitted in the two first through holes 39 of the yoke 11, two connecting concave portions 47 located on the opposite side of the annular groove 33 of the yoke 11 with respect to the boss portions 46, a plate-shaped arm portion 48 extending from one end including the boss portions 46 and the connecting concave portions 47 outward in the radial direction of the yoke 11, and a cable connecting portion 49 having a rectangular tubular shape with a closed bottom and connected to the distal end of the arm portion 48.

Each boss portion 46 is formed into a columnar shape fitted in the small-diameter portion 43 of the first through hole 39 of the yoke 11 by press fitting, and fixed in a state in which the boss portion 46 is fitted in the small-diameter portion 43. Fixing of the boss portion 46 can be done by high-frequency gluing or ultrasonic welding, or by bonding using an adhesive 50 applied between the boss portion 46 and the first through hole 39.

In this embodiment, the boss portion 46 corresponds to "convex portion" in the present invention. The total length of the boss portion 46 is set to allow a distal end 46a of the boss portion 46 to enter the large-diameter portion 42. An engaging groove 46b extending in a direction crossing a center line C (see FIG. 5) of the first through hole 39 is formed in the distal end 46a of the boss portion 46a, in other words, a portion of the boss portion 46 located in the large-diameter portion 42. As shown in FIGS. 8 to 11, the engaging groove 46b is formed along the outer surface of the boss portion 46 having a columnar shape in a range about ½ of the outer surface of the boss portion 46.

The large-diameter portion 42 of the first through hole 39 of the yoke 11 is filled with the adhesive 50 used to fix the boss portion 46 to the yoke 11 and the insulating resin 35 used to seal the exciting coil 34. Note that fixing of the boss portion 46 to the yoke 11 can also be done by welding the outer side of the portion of the boss portion 46 located in the large-diameter portion 42 to the inner side of the large-diameter portion 42 by heat caulking.

Figure 12:
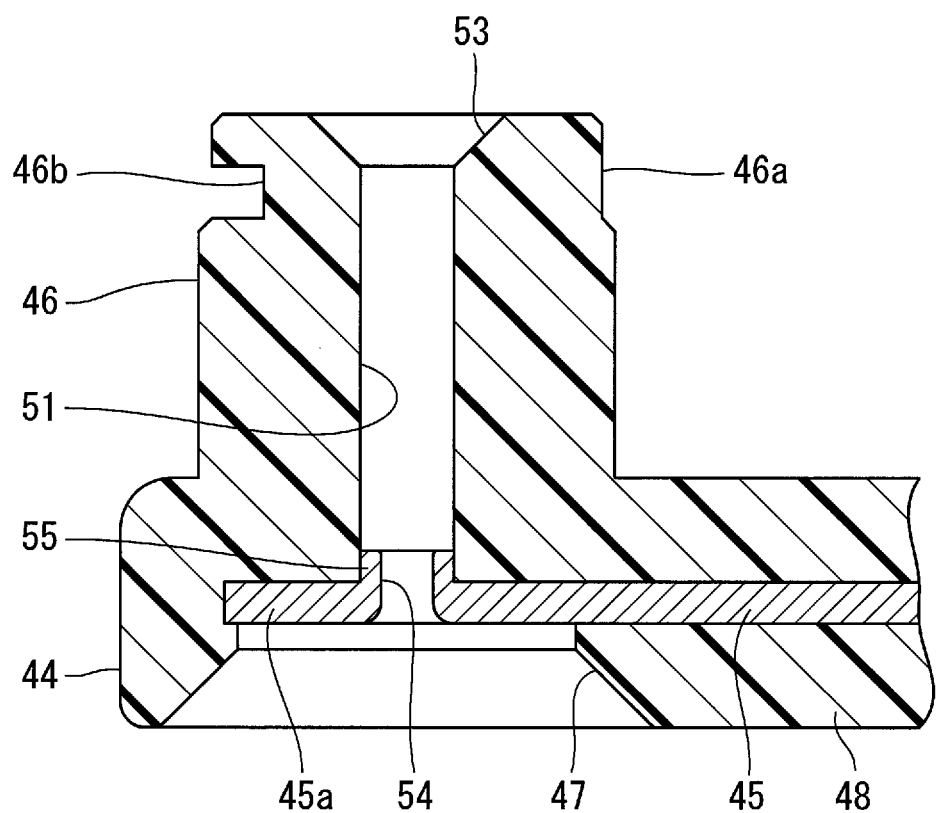
FIG. 12 is a sectional view taken along a line XII-XII in FIG. 7.

As shown in FIG. 12, a second through hole 51 is formed at the axial portion of the boss portion 46. The second through hole 51 extends in a direction parallel to the center line C of the first through hole 39 of the yoke 11. The hole diameter of the second through hole 51 permits insertion of an extraction end 52 (see FIG. 6) of the exciting coil 34. The extraction ends 52 include a winding start end and a winding termination end of the exciting coil 34. As shown in FIG. 12, an opening portion of the second through hole 51 according to this embodiment on the side of the annular groove 33 of the yoke 11 is formed by a tapered surface 53 that gradually reduces the hole diameter into the boss portion 46 such that the extraction end 52 can easily enter the second through hole 51.

Figure 7:
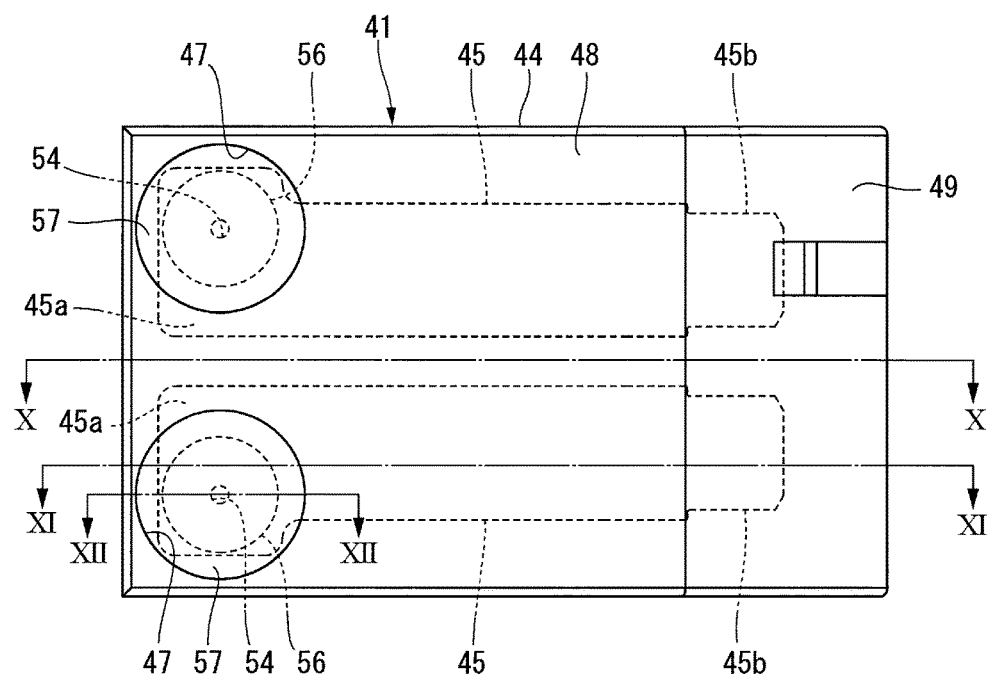
FIG. 7 is a rear view of an external power supply connector.
Figure 8:
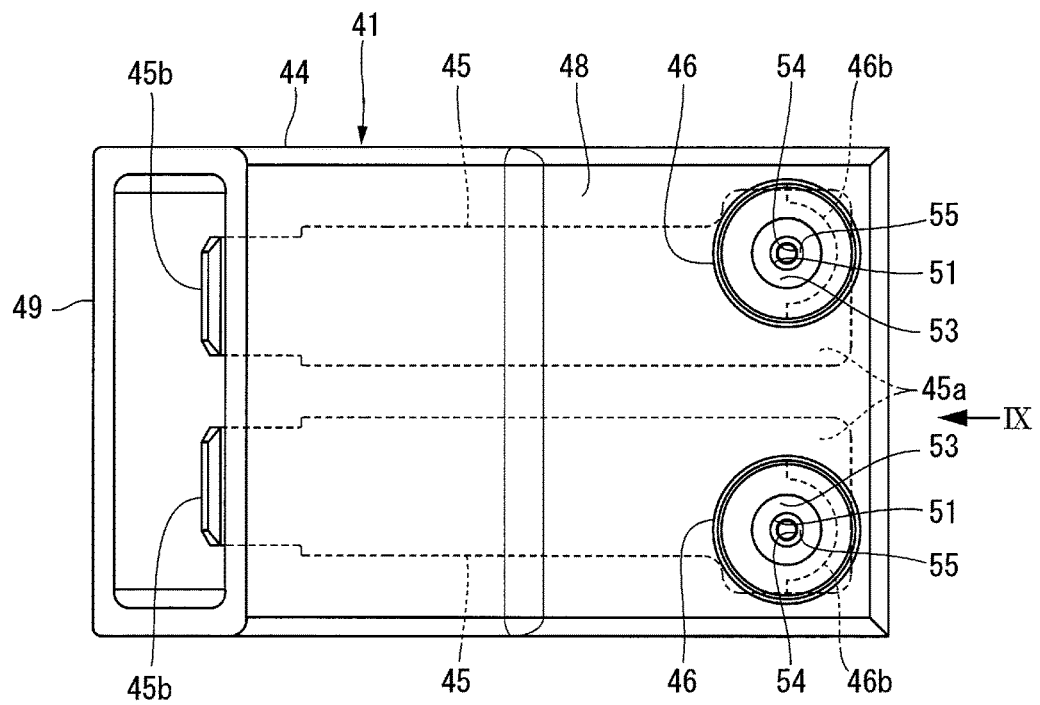
FIG. 8 is a front view of the external power supply connector.
Figure 9:
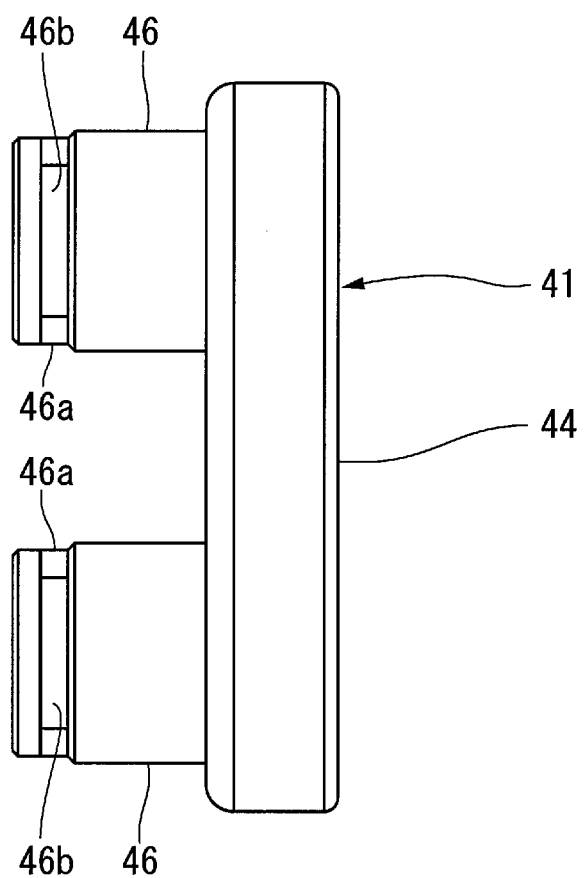
FIG. 9 is a view seen from the direction of an arrow IX in FIG. 8
Figure 10:
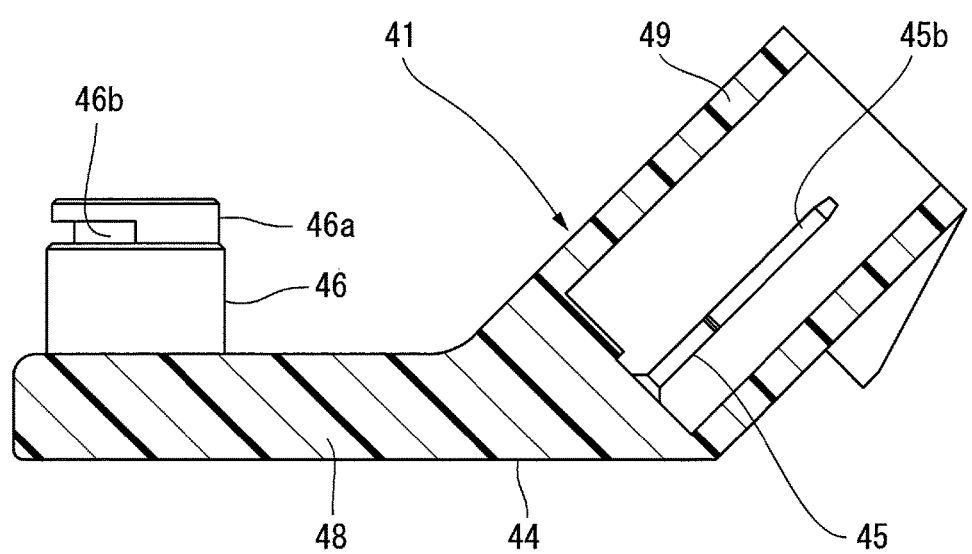
FIG. 10 is a sectional view taken along a line X-X in FIG. 7.
Figure 11:
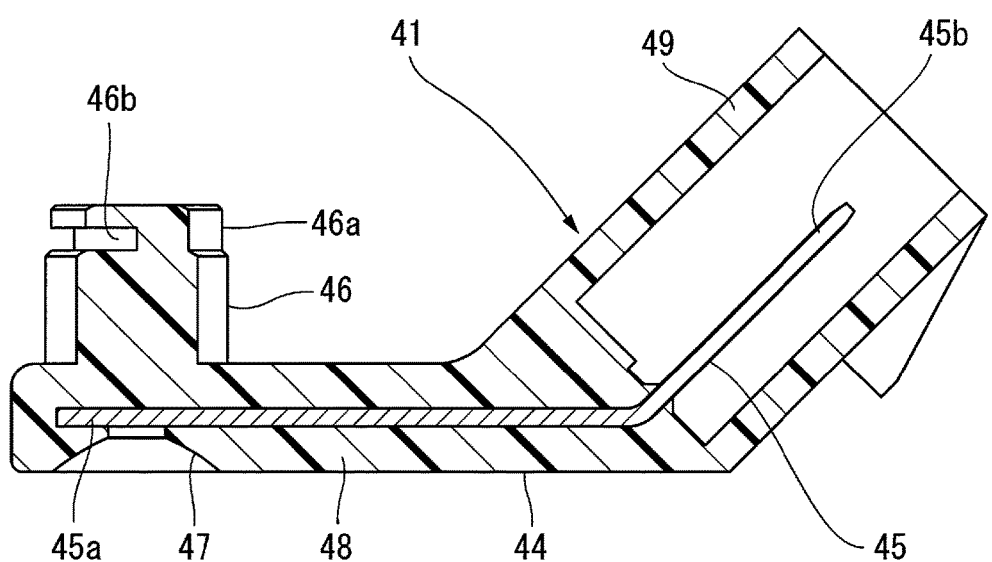
FIG. 11 is a sectional view taken along a line XI-XI in FIG. 7.

The connecting concave portion 47 is formed into a shape that opens to the rear surface side (the opposite side of the yoke 11) of the boss portion 46 in the terminal housing 44 and gradually reduces the opening diameter from the opening edge to the boss portion 46. The opening shape of the connecting concave portion 47 is circular, as shown in FIG. 7.

Figure 13:
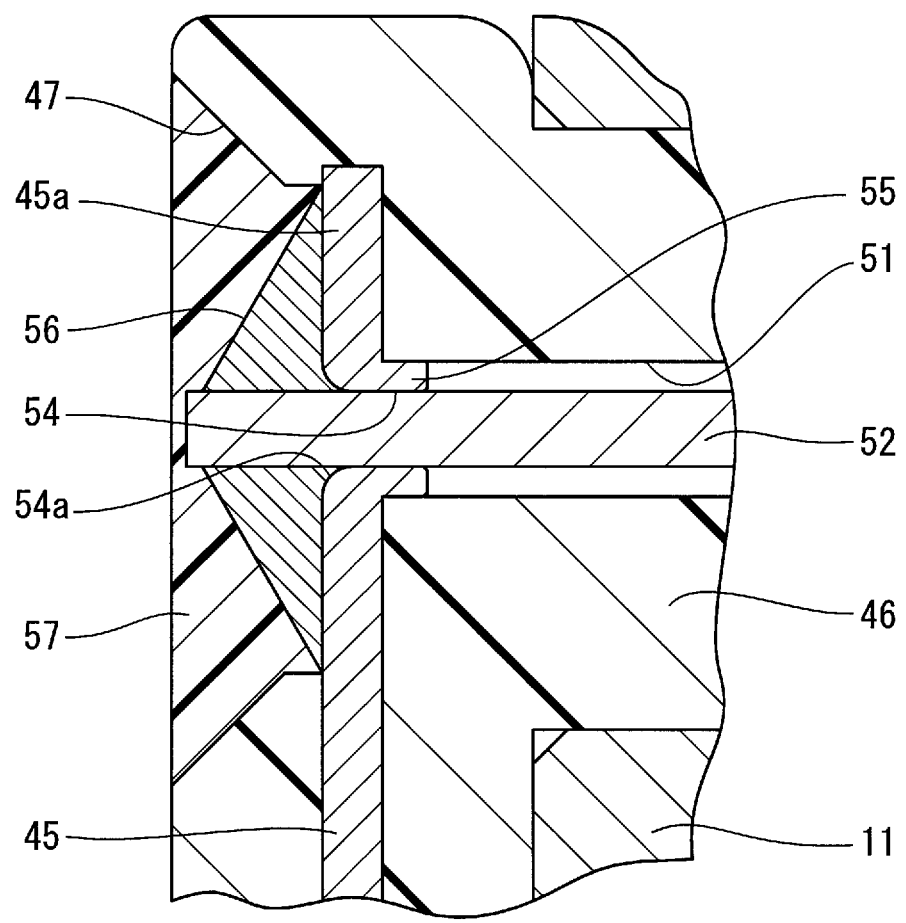
FIG. 13 is an enlarged sectional view showing the soldering portion between a terminal and an extraction end.

The external connecting terminal 45 includes a first end 45a exposed to the connecting concave portion 47 of the terminal housing 44, and a second end 45b projecting into the cable connecting portion 49 of the terminal housing 44. The terminal 45 is provided for each boss portion 46. As shown in FIG. 13, a coil extraction hole 54 configured to extract the extraction end 52 of the exciting coil 34 is formed in the first end 45a of the terminal 45 by burring. The burring is done by pressing a punch (not shown) against a surface of the terminal 45 on the opposite side of the boss portion 46. When the burring is performed for the terminal 45, a cylinder 55 projects integrally with the first end 45a of the terminal 45.

As shown in FIG. 13, the terminal 45 is buried in the terminal housing 44 such that the cylinder 55 is connected to the second through hole 51 of the boss portion 46. For this reason, the coil extraction hole 54 formed by the hollow portion of the cylinder 55 continues to the second through hole 51 of the boss portion 46. The coil extraction hole 54 according to this embodiment is located on the same center line as that of the second through hole 51 of the boss portion 46.

The opening shape of the coil extraction hole 54 is circular. The hole diameter of the coil extraction hole 54 is smaller than the hole diameter of the second through hole 51 of the boss portion 46 and slightly larger than the line diameter of the extraction end 52 of the exciting coil 34. The extraction end 52 passes through the second through hole 51 and the coil extraction hole 54 and projects into the connecting concave portion 47 and is electrically and mechanically connected to the terminal 45 by solder 56. The solder 56 rises conically around the terminal 45 from the bottom of the connecting concave portion 47 (the first end 45a of the terminal 45), and hardens in this state. After the soldering, a waterproof resin 57 is put in the connecting concave portion 47 and hardened. As the waterproof resin 57, for example, a UV curing resin or a moisture curing silicone resin can be used.

The coil extraction hole 54 includes an opening edge 54a located on the opposite side of the second through hole 51. The opening edge 54a plastically deforms at the time of burring. Hence, the opening edge 54a is formed into an arc section with a hole diameter gradually decreasing toward the second through hole 51. The solder 56 is in contact with the curved surface of the opening edge 54a as well.

<Description of Procedure of Assembling Exciting Device>

Figure 14:
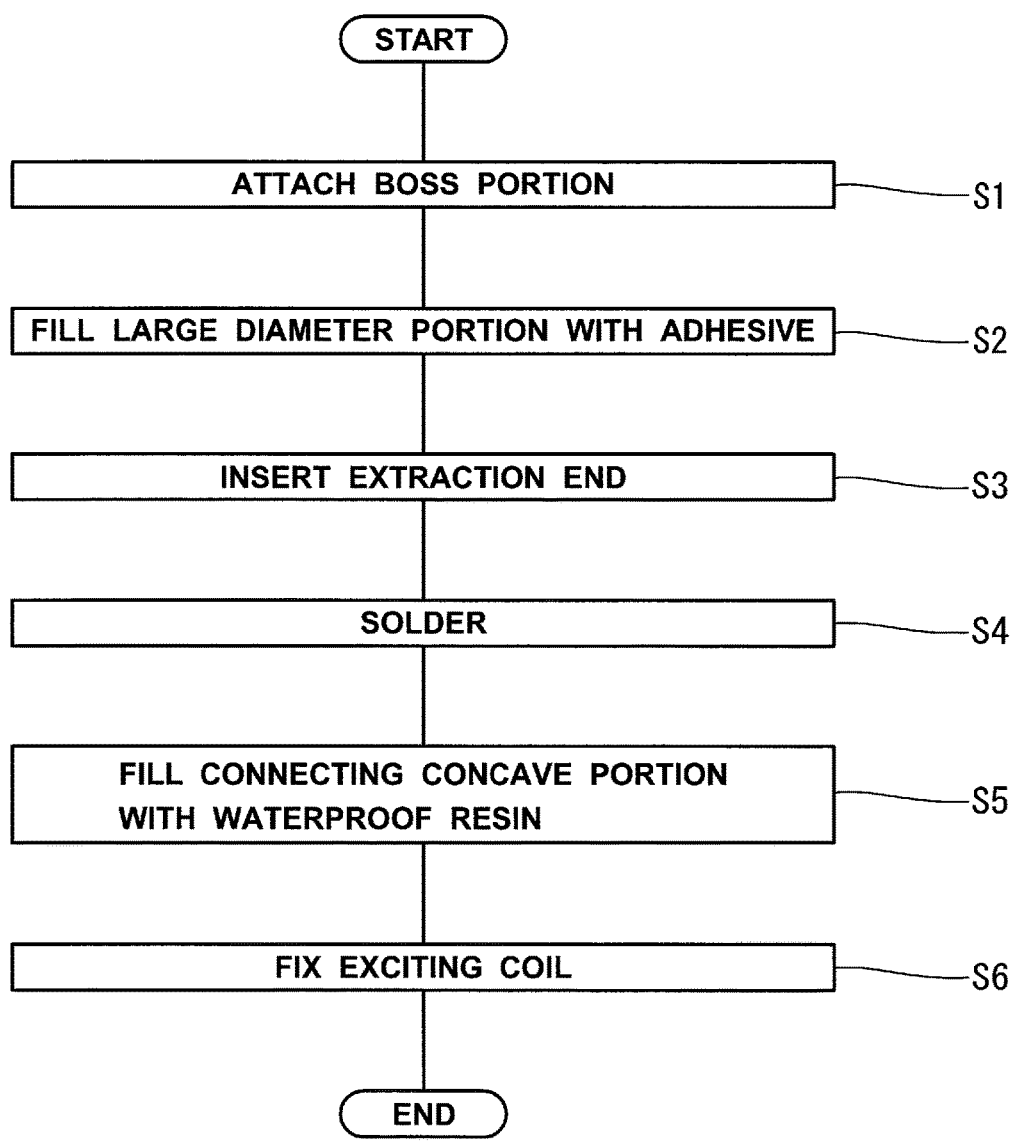
FIG. 14 is a flowchart for explaining a procedure of assembling the exciting device.

A procedure of assembling the exciting device 3 having the above-described arrangement will be described next with reference to the flowchart shown in FIG. 14. First, in a boss portion attaching step S1, each boss portion 46 of the terminal housing 44 is press-fitted in the small-diameter portion 43 of a corresponding one of the first through holes 39 of the yoke 11 and bonded or welded to the wall surface of the first through hole 39. Next, in an adhesive filling step S2, the large-diameter portion 42 of the first through hole 39 of the yoke 11 is filled with the adhesive 50. At this time, the engaging groove 46b of the boss portion 46 is filled with the adhesive 50 as well.

After that, in an extraction end insertion step S3, the extraction end 52 of the exciting coil 34 is inserted into the second through hole 51 of the boss portion 46 from the side of the annular groove 33 of the yoke 11 and passed through the coil extraction hole 54 of the terminal 45. In the extraction end insertion step S3, the exciting coil 34 is stored in the annular groove 33 of the yoke 11. Note that before the exciting coil 34 is inserted into the annular groove 33 in this way, the detent plate 28 is fixed to the yoke 11 by the rivets 31.

After the exciting coil 34 is inserted into the annular groove 33 of the yoke 11, the distal end of the extraction end 52 is cut to a length so the extraction end 52 does not project outward from the connecting concave portion 47 of the terminal housing 44. In a soldering step S4, the extraction end 52 is soldered to the terminal 45. The soldering is done in a state in which the extraction end 52 is passed through the coil extraction hole 54 of the terminal 45 and held by the terminal 45, and is exposed to the center of the connecting concave portion 47. The molten solder 56 collects inside the connecting concave portion 47 and does not flow to the side of the other adjacent extraction terminal 45. For this reason, the connecting concave portion 47 substantially serves as a concave portion to collect the solder.

After the end of the soldering, in a waterproof resin filling step S5, the connecting concave portion 47 is filled with the waterproof resin 57. In an exciting coil fixing step S6, the annular groove 33 of the yoke 11 is filled with the insulating resin 35, and the insulating resin 35 is hardened. When the insulating resin 35 is hardened, the assembly of the exciting device 3 ends.

<Description of Effects of Embodiment>

In this embodiment, in a state in which the boss portion 46 of the terminal housing 44 is fitted in the first through hole 39 of the yoke 11, the extraction end 52 of the exciting coil 34 is inserted into the second through hole 51 of the terminal housing 44 from the side of the annular groove 33, thereby inserting the distal end of the extraction end 52 into the coil extraction hole 54 of the external connecting terminal 45. In this state, the extraction end 52 is soldered to the terminal 45. For this reason, when performing soldering, the extraction end 52 need not be clamped by or hooked on the terminal 45 and temporarily fixed. Hence, according to this embodiment, since the assembly process for temporarily fixing the extraction end 52 can be omitted, the productivity improves as compared to a related device, and the exciting device 3 can be made inexpensive.

In the exciting device 3 according to this embodiment, the opening edge 54a of the coil extraction hole 54 is formed into a shape with a hole diameter gradually decreasing toward the second through hole 51. For this reason, in a state in which the extraction end 52 is inserted into the coil extraction hole 54, the opening edge 54a sinks in conformity with the surface of the extraction end 52. Hence, the molten solder 56 readily collects near the periphery of the extraction end 52 at the start of the soldering operation. For this reason, the soldering operation is easy, and the productivity can further be improved. Additionally, when this form is employed, the solder 56 enters the coil extraction hole 54 in accordance with the sinking of the opening edge 54a. Hence, the contact area between the extraction end 52 and the solder 56 increases, and the reliability of electrical connection increases.

In this embodiment, the cylinder 55 connected to the second through hole 51 is integrally formed on the portion of the external connecting terminal 45 exposed into the connecting concave portion 47. The coil extraction hole 54 is formed by the hollow portion of the cylinder 55. For this reason, since the cylinder 55 closes the gap between the second through hole 51 and the extraction end 52, the molten solder 56 can be prevented from unnecessarily entering the second through hole 51.

The first through hole 39 in the bottom wall 37 according to this embodiment includes the small-diameter portion 43 in which the boss portion 46 of the terminal housing 44 is fitted, and the large-diameter portion 42 open into the annular groove 33. The distal end 46a of the boss portion 46 is located in the large-diameter portion 42, and has the engaging groove 46b extending in the direction crossing the center line C of the first through hole 39. According to this embodiment, when the adhesive 50 is injected into the large-diameter portion 42 of the first through hole 39 to fill the engaging groove 46b of the boss portion 46 with the adhesive 50, the adhesive 50 hardened in the engaging groove 46b engages with the boss portion 46 and regulates the movement of the boss portion 46 relative to the yoke 11. Hence, the terminal housing 44 can easily be fixed as compared to a case in which the terminal housing is fixed to the yoke using pawl pieces projecting from the yoke, as in a related fixing structure. As a result, the productivity can be improved, including the process of fixing the terminal housing 44 to the yoke 11.

Note that in this embodiment, the first end 45a of the external connecting terminal 45 is exposed to the connecting concave portion 47 of the terminal housing 44, and the coil extraction hole 54 is formed in the first end 45a. However, another portion of the external connecting terminal 45 may be exposed, and the coil extraction hole 54 may be formed there.

What is claimed is:

1. An exciting device for an electromagnetic connection device, comprising:
   a yoke including an annular groove and a first through hole formed in a bottom wall serving as a bottom of the annular groove;
   an exciting coil stored in the annular groove;
   a terminal housing including a convex portion fitted in the first through hole and a concave portion located on an opposite side of the annular groove with respect to the convex portion, the convex portion including a second through hole extending in a direction parallel to a center line of the first through hole; and
   an external connecting terminal buried in the terminal housing in a state in which a portion of the external connecting terminal is exposed in the concave portion, the external connecting terminal including a coil extraction hole formed in the portion exposed in the concave portion and continuing to the second through hole, and the exciting coil including an extraction end soldered to the external connecting terminal in a state in which the extraction end is passed through the second through hole and the coil extraction hole.

2. The device according to claim 1, wherein the coil extraction hole includes an opening edge located on an opposite side of the second through hole and having a hole diameter gradually decreasing toward the second through hole.

3. The device according to claim 1, wherein the external connecting terminal includes a cylinder formed integrally with the portion exposed in the concave portion and connected to the second through hole, and
   the coil extraction hole is formed by a hollow portion of the cylinder.

4. The device according to claim 1, wherein the first through hole includes a small-diameter portion in which the convex portion is fitted, and a large-diameter portion open into the annular groove and having a hole diameter larger than a hole diameter of the small-diameter portion,
   the convex portion includes a distal end located in the large-diameter portion, and
   the distal end includes an engaging groove extending in a direction crossing the center line of the first through hole.

* * * * *